(12) United States Patent
Anson (10) Patent No.: US 7,984,868 B2
(45) Date of Patent: Jul. 26, 2011

(54) ADJUSTABLE GRINDER

(75) Inventor: James H. Anson, Auburn, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 10/553,551

(22) PCT Filed: Apr. 16, 2004

(86) PCT No.: PCT/US2004/011741
§ 371 (c)(1),
(2), (4) Date: Jan. 25, 2007

(87) PCT Pub. No.: WO2004/093615
PCT Pub. Date: Nov. 4, 2004

(65) Prior Publication Data
US 2007/0187534 A1    Aug. 16, 2007

(51) Int. Cl.
*B02C 7/14* (2006.01)
(52) U.S. Cl. .................... 241/261.2; 241/37
(58) Field of Classification Search ............ 241/30, 241/37, 261.2, 261.3
See application file for complete search history.

(56) References Cited

U.S. PATENT DOCUMENTS

| 2,059,249 A | 11/1936 | Kopf |
| 2,204,057 A | 6/1940 | Swartz |
| 2,297,637 A | 9/1942 | Sullivan |
| 2,483,472 A | 10/1949 | Matarrese |
| 2,606,722 A | 8/1952 | Gronberg |
| 2,743,874 A | 5/1956 | Asplund |
| 3,799,456 A | 3/1974 | Jewell |
| 3,977,612 A | 8/1976 | Brown et al. |
| 4,022,388 A | 5/1977 | Schnitzer |
| 4,037,801 A | 7/1977 | Jimenez |
| 4,749,135 A * | 6/1988 | Walsh ............... 241/247 |
| 4,813,622 A | 3/1989 | Nidiffer et al. |
| 4,820,980 A * | 4/1989 | Dodson-Edgars ....... 324/207.24 |
| 4,821,966 A * | 4/1989 | Ephraim et al. ............. 241/55 |
| 4,971,259 A | 11/1990 | Nidiffer |
| 5,172,868 A | 12/1992 | Midden |
| 5,462,236 A | 10/1995 | Knepler |
| 5,522,556 A | 6/1996 | Knepler |
| 5,558,283 A | 9/1996 | Fisher et al. |
| 5,564,636 A | 10/1996 | Mock et al. |
| 5,605,290 A * | 2/1997 | Brenholdt ............. 241/21 |
| 5,645,230 A | 7/1997 | Marogna et al. |

OTHER PUBLICATIONS

International Search Report for International Application No. PCT/US2004/11741, International Filing Date Apr. 16, 2004. ISR completion date Oct. 27, 2004, Date of Mailing Nov. 26, 2004.

\* cited by examiner

*Primary Examiner* — Mark Rosenbaum
(74) *Attorney, Agent, or Firm* — Barnes & Thornburg LLP (57) ABSTRACT

Disclosed is a grinder which includes a grinder assembly retained in a housing. The grinder assembly receives material for grinding such as coffee beans. Grinding burrs are provided, one of which is rotated by a grinder drive motor of the grinder assembly. The other of the burrs is generally non-rotatable with regard to the general grinding operation. The two grinding burrs are provided with grinding surfaces against which beans are ground. The grinding surfaces are spaced a desired dimension away from each other to produce a desired grind of coffee. An apparatus, system and method is disclosed for adjusting at least the generally non-rotatable burr to maintain, calibrate or otherwise adjust the dimension or gap between the grinding surfaces of the burrs.

6 Claims, 5 Drawing Sheets

ADJUSTABLE GRINDER

BACKGROUND

This disclosure relates to a grinding apparatus for grinding material, such as coffee beans.

Grinding apparatuses are well-known in the art. Machines have been developed to convert roasted coffee beans into a ground substance suitable for brewing. Additionally, differing tastes in coffee have fostered the need to have differing grinds. For example, if one desires an espresso type of coffee, a fine grind of coffee may be needed for the espresso brewing process. However, some may desire the taste of freshly-ground coffee, but desire the flavors associated with a drip brewing process. A more coarse grind may suit this coffee drinker. Consequently, the prior art developed apparatuses that were adjustable and could provide differing grinds of coffee.

U.S. Pat. No. 5,201,474 to Midden shows a coffee grinder which enables one to select a desired grind of coffee. Midden teaches that unground coffee beans may be fed between two grinding elements commonly referred to as grinding burrs in order to produce a desired grind. The grinding elements were of differing shapes and sizes, and had differing surface configurations in order to alter the type of grind. Therefore, in order to obtain differing grinds, one had to change the grinding elements.

U.S. Pat. No. 5,558,283 to Fisher et al. shows a grinder having the ability to provide differing levels of grind. Using the Fisher apparatus, one could selectively adjust the space between spaced apart grinding elements in order to adjust the grind of coffee. The Fisher apparatus utilized a pair of grinding burrs, one of which rotated and the other of which was substantially stationary. However, the Fisher et al. apparatus biased the two grinding elements toward one another, which allowed the gap to expand or contract during the grinding process; therefore, the gap could vary, resulting in a potentially uneven grind over time.

SUMMARY

The current disclosure improves on the prior art. The apparatus and method as disclosed includes a housing with an inlet and an outlet positioned near opposite ends of a longitudinal axis. A generally stationary grinding element or non-rotatable burr is retained in the housing. The non-rotatable burr is selectively movable along the longitudinal axis, but will does not rotate during the grinding process.

A rotating grinding element or rotatable burr is also positioned within the housing, and held at a fixed point on the longitudinal axis. A drive motor rotates the rotatable burr about the longitudinal axis. The non-rotatable burr is selectively movable between an idle position where the burrs engage one another and a grinding position where a gap exists between the burrs.

An adjusting device positioned within the housing enables selective movement of the non-rotatable burr along the longitudinal axis. In one embodiment, the adjusting device includes a controllable motor is connected to a worm gear positioned to engage gear teeth extending from a lateral edge of the non-rotatable burr. As the worm gear turns, it urges rotation of the non-rotatable burr about the longitudinal axis.

The non-rotatable burr includes a collar extending in a direction away from the rotatable burr. The collar and the inner surface of the housing are cooperatively threaded to enable movement of the non-rotatable burr along the longitudinal axis. There is a hole in the grinding surface of the non-rotatable burr. The collar has a hollow interior positioned around the hole; thus, the interior of the collar is connected with the inlet to provide a passage for material to pass from the inlet toward the gap between the burrs. A feeding auger urges unground material from the inlet toward the gap. The feeding auger is coupled to the drive motor at a first end and coupled to the rotatable burr at a second end.

The housing has a second outlet sufficiently sized to allow a clearance between an outer diameter of the rotatable burr and a corresponding inner surface of the housing. The clearance is too small to allow unground material to pass through, but large enough to allow ground material to escape. After passing through the gap, the ground material is expelled from the housing via the outlet.

The disclosed method includes the steps of providing a housing having an inlet and an outlet, providing a non-rotatable burr, and providing a rotatable burr. The method further includes providing an adjuster to selectively and controllably position the non-rotatable burr with respect to the rotatable burr, and bringing the burrs into contact with one another during a calibration or adjustment event. The method maintains a desired, pre-determined dimension in the gap between the burrs. The method allows for calibration of the gap to produce a desired type of grind from the grinder.

The method also includes the operation of the adjuster to selectively move the non-rotatable burr with respect to the rotatable burr to provide or set a gap of a desired dimension between the burrs. Additionally, a preselected amount of unground material is introduced into the inlet. A rotator turns the rotatable burr in order to grind the material, and then is expelled from the outlet. Preferably, the method also includes the step of moving the non-rotatable burr back into contact with one another once the preselected material has been expelled from the outlet.

The method may also include the providing of a pair of actuators: a first actuator to selectively operate the adjuster, and a second actuator in communication with the drive motor that delivers torque to the rotatable burr. The method may further include the step of placing the first and second actuators in communication with one another, so that when the first actuator finally locates the non-rotatable burr to its selected position, the second actuator automatically activates the rotator.

Other objects, advantages and novel features of the present disclosure will become apparent from the following detailed description when considered in conjunction with the accompanying drawings.

DETAILED DESCRIPTION

Figure 1:
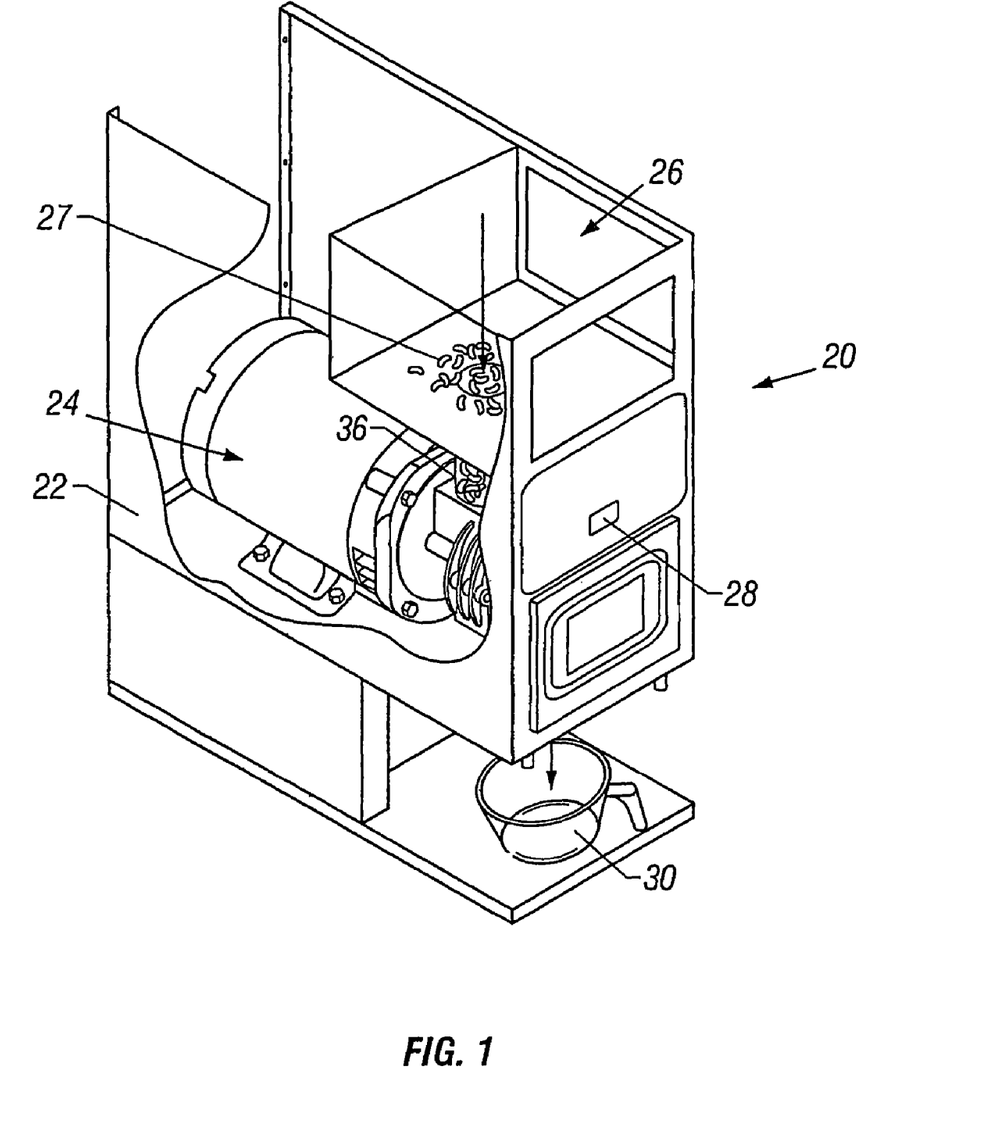
FIG. 1 shows a perspective view of a grinding apparatus.

FIG. 1 shows a grinding apparatus or grinder 20 having a housing 22 which contains a grinder assembly 24. A bean hopper 26 is provided in the housing 22 for retaining a quantity of beans 27. The hopper 26 is in communication with the grinder assembly 24 for generally gravity feeding the beans 27 to the grinder assembly 24 for grinding. Some vibrational transference of the grinder 24 to the bean hopper 26 helps promote the gravitational flow to the beans from the hopper 26 to the grinder assembly 24 through the passage 36. Additionally, as will be described in greater detail below, an auger 70 helps draw beans into the grinder assembly 24. The combination of these, as well as possible other actions on the beans, helps maintain a general flow of beans from the hopper 26 to the grinder assembly 24 when grinding beans.

To operate, the user turns on the grinder assembly 24 at a control switch 28 and grinds a predetermined time related volume of ground coffee which is collected in a container 30 positioned below. The container 30 may be a coffee brewing funnel, coffee retaining bag, French press coffee brewing pot, or any other type of container which might be used to collect and brew, store or otherwise retain ground coffee. A variety of control functions can be incorporated in an appropriately configured control panel or control interface. For example, batch size or type of grind can be controlled using selectable control elements such as dials or dedicated switches. In the interest of clarity in this disclosure, reference will be made to the switch with the understanding that any and all other control elements or interfaces are contemplated.

Figure 2:
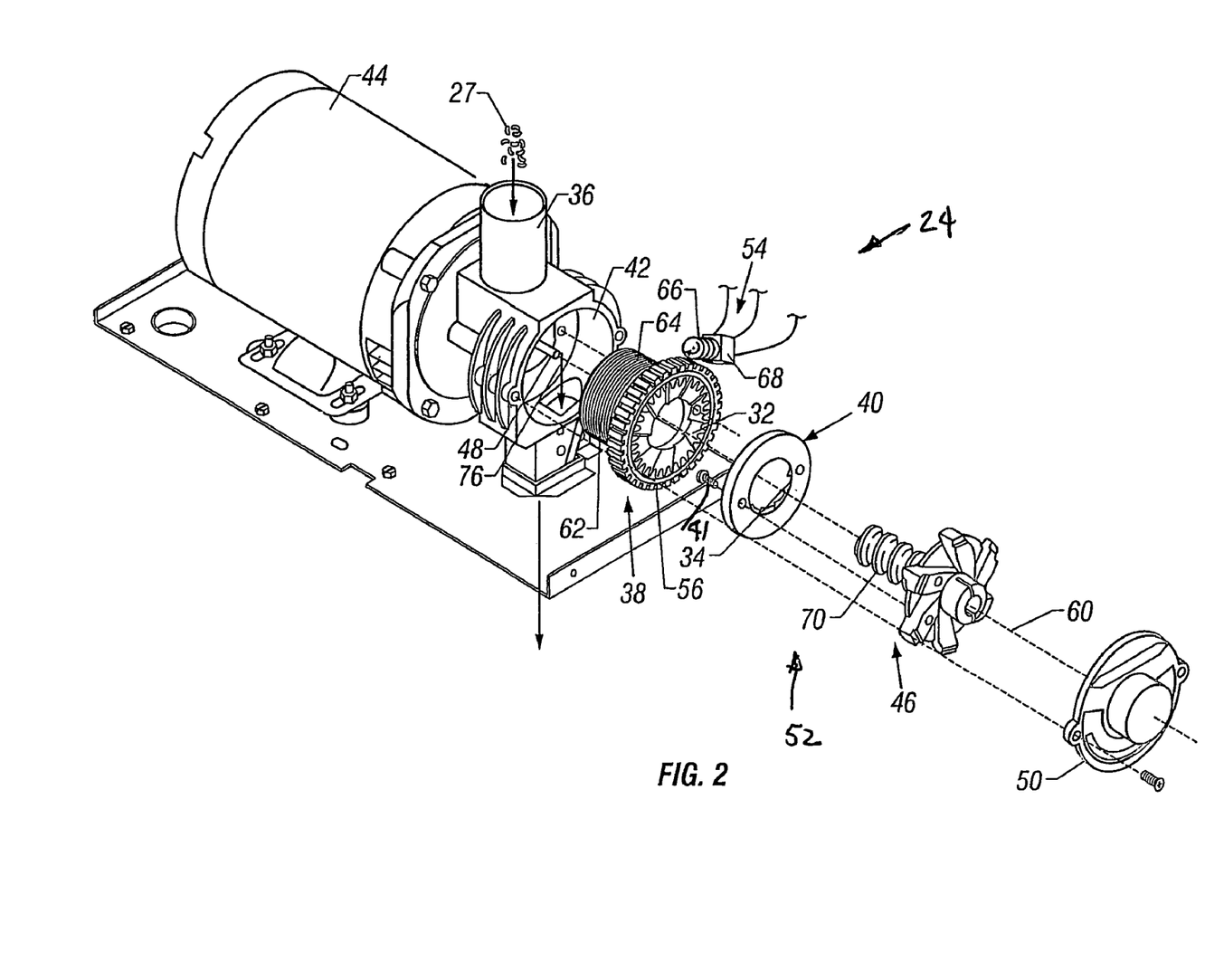
FIG. 2 shows an enlarged, partially exploded, perspective view of a grinder assembly.

FIG. 2 shows an exploded perspective view of the grinder assembly 24. As shown, beans 27 flow through the passage 36 to a grinding chamber 42. The pair of generally opposed grinding burrs 38, 40 are contained within the grinding chamber 42. A grinder drive 44 in the form of a controllable electric motor of known construction is provided to produce controllable rotary motion of at least one of the grinding burrs 38, 40. The other of the grinding burrs 38, 40 is maintained in a generally stationary position so as to facilitate grinding of beans 27 between the grinding burr grinding surfaces 32, 34. In the embodiment shown in FIG. 2, the first burr 38 is referred to as a generally non-rotatable burr 38. The second burr 40 shown in FIG. 2 is referred to as the rotatable burr 40. Rotatable burr 40 is attached with fasteners 41 to a rotating assembly 46 which is connected to a shaft 48 of the grinder drive motor 44. As an additional matter, the grinding burrs 38 and 40 are illustrated and generally described as being disc-shaped. However, it will be appreciated by one of skill in the art that these burrs are not limited to disc shapes and may be other configurations as well. A cover plate 50 is provided for attachment to the grinding assembly 24 to cover the grinding chamber 42.

The first and second burrs 38, 40 define a grinding burr assembly 52. A controllable burr adjuster 54 is operatively coupled to the grinding burr assembly 52 for controllably adjusting at least one of the grinding burrs. As shown in FIG. 2, the first grinding burr 38 is provided with gear teeth 56 on an exterior surface 58 of the burr 38. The first burr 38 is retained in the chamber in a generally fixed position with regard to rotation of the burrs for grinding purposes. However, as will be shown in subsequent figures, a degree of axial adjustment along a central or longitudinal axis 60 of the grinder assembly 24 facilitates small adjustments of the first grinding surface 32 of the first burr 38 relative to the second grinding surface 34 of the second burr 40.

The burr adjuster 54 shown in FIG. 2 is one embodiment of such a burr adjuster 54 and it is envisioned that one of skill in the art will be able to devise other means of adjusting one of the burrs 38, 40 relative to the other burr and to maintain such small burr adjustments. Burr adjustments are important to provide continued calibration and adjustment of the grinding surfaces 32, 34 and to maintain a consistent desired grind produced by the grinder assembly 24.

Figure 3:
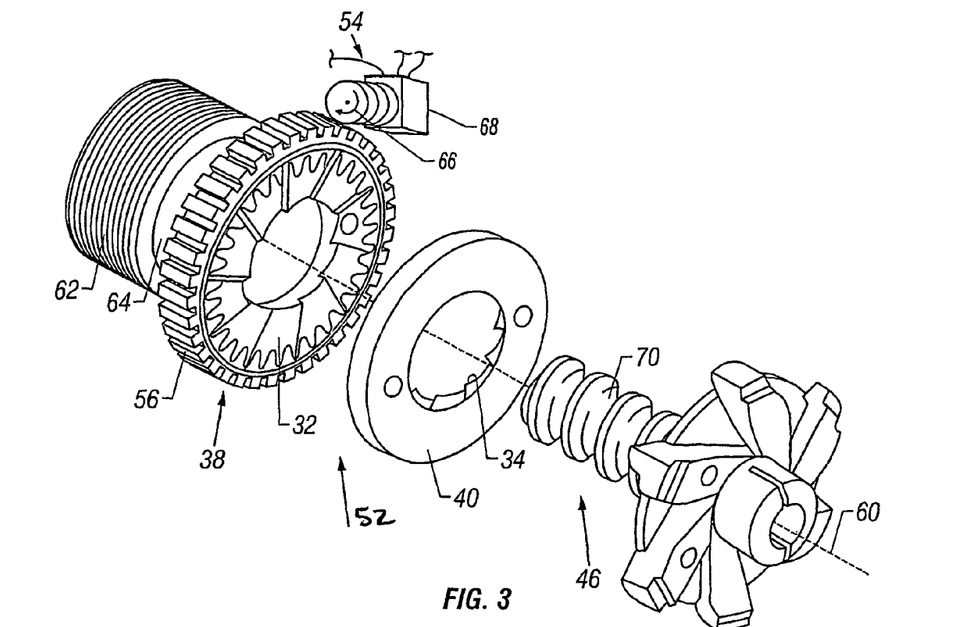
FIG. 3 shows an enlarged, partially exploded, perspective view of a grinding burr assembly of the grinding apparatus.

With further reference to FIG. 3, an embodiment of such a burr adjuster assembly 54 includes threads 62 on an exterior surface of a barrel 64 to which the first burr 38 is attached. The threads 62 engage corresponding threads on an interior surface of the grinding chamber 42. The threads 62 are sized and dimensioned so as to provide a desired degree of precision and adjustment of the first burr 38 along the central axis 60. The gear teeth 56 engage a corresponding worm gear 66 driven by a controllable motor 68. The worm gear and controllable motor 68 are included in the burr adjuster 54. As shown in FIG. 3, the threaded structure 62 provides a generally fixed or retainable reference point for the first burr. The threaded structure helps retain the desired adjustment in combination with the positioning provided by the burr adjuster 54. As such, the threads, which can be in the form of other structures as well that retain a desired adjustment, help to maintain the desired adjustment in a desired position, but can also be adjustably and selectively moved along the longitudinal axis 60 upon adjustment by the adjuster 54.

Figure 4:
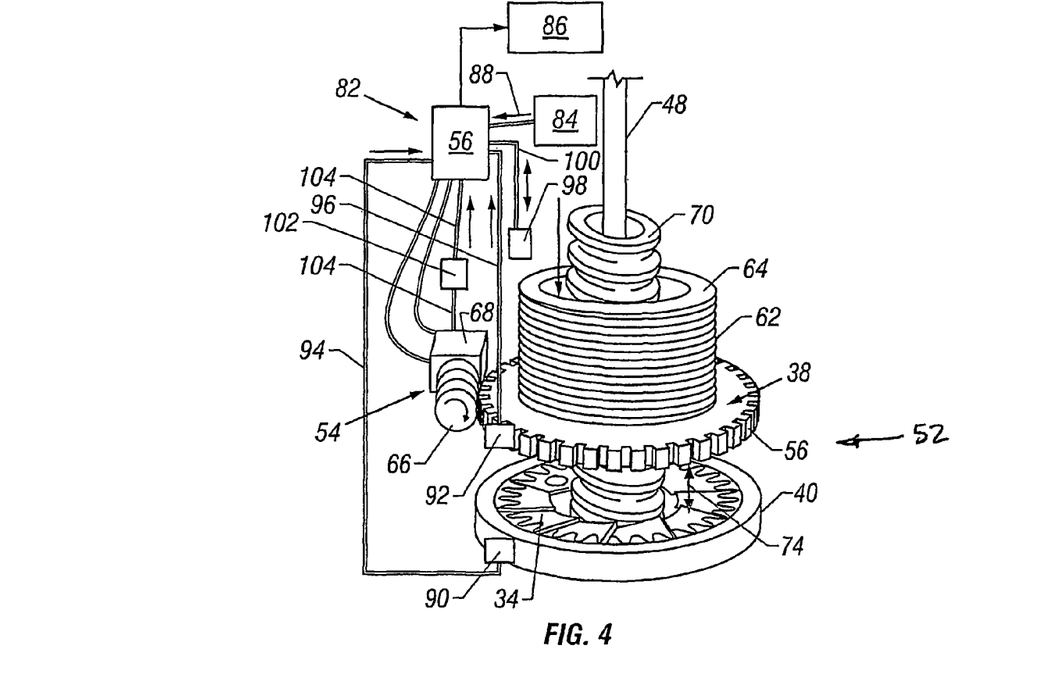
FIG. 4 shows an enlarged, perspective, diagrammatic view of a grinding burr assembly.

As can be seen in FIGS. 3 and 4, beans 27 are drawn into position between the grinding surfaces 32, 34 by means of an auger 70 carried on the rotating assembly 46. As noted above, the auger 70 works in cooperation with the gravity feed and vibrational movement of the beans from the hopper 26 through the passage 26 into the grinding chamber 42. It should be noted that other means for moving beans to the grinding brewer can be employed, such other bean moving means of known construction as currently available or to be developed and which can be used in combination with grinding mechanisms. The auger 70 has an external dimension which is sufficiently smaller than the bore 72 of the barrel 64 to advance the beans 27 into a gap 74 between the first and second grinding surfaces 32, 34. The gap 74 as shown in FIG. 4 is somewhat exaggerated so as to better show the relationship of the components. It should be noted that the gap 74 can be adjusted to many possible settings to obtain a desired grind or size of ground particle from the grinder 20. In this regard, it should be appreciated that in order to obtain very fine grind having small particles, the grinding surfaces 32, 34 are brought into close relationship. The surfaces 32, 34 are provided with grinding structures to grind yet generally not burn, the surfaces of the beans and particles being processed in the grinder. As such, the grinding surfaces 32, 34 should be spaced apart to some degree so as to avoid unnecessary interference by the grinding surfaces. For a larger ground particle size the grinding surfaces 32, 34 are spaced apart. With further reference to FIGS. 1 and 2, beans 27 which are fed through the passage 36 into the chamber 42 are ground between the first and second burrs 38, 40. Ground material produced by the grinding operation is expelled from the grinding assembly 24 through an outlet passage 76. Those particles falling through the outlet passage 76 are deposited in the container 30.

Having described the general structures and functions of the grinding 20 disclosed herein we now move on to the methods of operation and adjustment of the grinder 20 and grinder assembly 24. The grinder assembly 24 operates in the general manner described above for grinding beans. Further, the present disclosure provides a method of adjusting the grinder 20 to help assure and produce ground particles of a generally consistent size or range of sizes. The consistency of the particles is achieved regardless of the size of the particles selected, for example espresso grind versus drip grind. In other words, the present system helps to maintain consistent grinding of particles to a desired size or range of sizes. The consistency and repeatability of the grind size is achieved by the controllable grinder assembly 24. For example, the general structure of the grinding burrs 38, 40 and the burr adjuster 54 is provided. However, additionally shown are system components shown in diagrammatic form which provide sensing, control, information storage and operation of grinder assembly 24.

The system as shown in FIG. 4 is shown generally diagrammatically in the interest of simplifying the system. For example, it is understood that corresponding threads are provided in the grinding chamber 42 to receive the threads 62 formed on the exterior of the barrel or collar 64. Additionally, it is understood that the motor 68 of the burr adjuster 54 is generally fixed in the housing relative to the first burr 38 so as to provide controlled rotary motion of the worm gear or adjuster body 64 relative to the gear teeth 56. Additionally, it will be understood that the burr adjuster 54 and the location of the corresponding teeth 56 could be altered such that the more distal burr (shown as burr 40 in FIG. 4) might be the fixed gear with the first gear 38 being the rotatable gear. In general, however, it is disclosed that the adjustment of the gap 74 between the burrs 38 and 40 is adjusted by adjusting the generally non-rotatable burr 38. In this regard, the adjuster 54 engaged with the corresponding burr 38 will maintain the desired adjustment during a grinding cycle. By maintaining the adjustment with the burr adjuster 54 and the generally non-rotatable burr 38, the complexity of the system is reduced because the adjustment does not need to occur at the rotating burr 40. By adjusting the generally non-rotating burr 38 greater stability and reliability may be introduced into the system.

Further, it will be appreciated that the threads 62 on the barrel 64 are generally relatively fine or narrowly spaced so as to further enhance the degree of precision with which the grinding burrs 38, 40 can be adjusted. Additionally, the increased number of threads and the relatively flat pitch of the threads as a result of being narrowly spaced apart can enhance the retention of the adjustment by reducing the possibility of rotation during the grinding operation which may occur as a result of vibration or friction between the beans being ground and the surfaces 32, 34 of the burrs 38, 40.

With further reference to FIG. 4, a control system 80 includes a number of elements to help display and adjust the desired grind and other features. For example, a controller 82 is provided. The controller 80 includes an input device 84 and may include a display 86. The input device 84 provides information over control line 88 to the controller 82. The controller 80 receives information from sensors 90, 92 which are connected via lines 94, 96, respectively, coupled to the controller 82. The sensors 90, 92 may be provided to detect the position of the grinding burrs 38, 40. A look-up table 98 is coupled to the controller 82 over line 100 to provide reference information for the controller 82 relative to the adjustments of the burrs 38, 40. Additionally, the look-up table 98 may include memory components such that additional events can be stored and used to update the information related to a particular setting. Further, the system 80 is programmable such that it learns from each grinding event or monitors each grinding event to adjust information within the system.

The sensors 90, 92 may be provided in a form such that they detect the positioning of the grinding burrs 80, 40 or the gap between the burrs through a variety of techniques. The sensors may be physical sensors that actually contact respective burrs or the gap to sense the physical dimensions relative to the burrs. Also, the sensors may be in the form of electrical, magnetic or optical sensors which sense the characteristics of the burrs and, in relation, the gap defined between the burrs. The sensors may also take the form of sonic detectors which sonically detect the relative position of a corresponding burr or of both burrs so as to provide a signal which can be processed to determine the gap between the burrs. It is envisioned that any form of sensing, including those noted above, but not limited to such sensors, may be used to determine the relationship of the burrs 38, 40, the position of each or both burrs, or the spacing of the gap between the burrs in any form possible. The interpretation of the embodiment of these sensors and the detecting of the gap between the burrs is envisioned to be broadly interpreted in the context of the present disclosure and is not intended to be limiting.

The controller 82 controls the motor 68 of the embodiment of the burr adjuster 54 shown in the figures. The controller 82 can control the motor 58 to operate the worm gear 64 a desired number of rotations or to a desired degree of load resistance. In this regard, a feedback sensor 102 can be coupled to the motor 68 and controller 82 over control lines 104.

During a calibration cycle, the burr adjuster 54 is operated to bring the generally non-rotatable burr 40 into a position in which the corresponding surface 34 contacts the surface 32 of the first burr 38. The engagement of the surfaces 32, 34 will be sensed by the load sensor 102 providing feedback to the controller 82. Once the contact is detected, sensed as an increased load on the motor 68, the controller 82 can operate the motor 68 to back off the burr 40 a desired amount. By backing off the surfaces 32, 34 based on the number of rotations of the worm gear 64, generally high precision dimensions can be maintained in the gap 74. This is true even if there is some wear on the surfaces 32, 34. In this regard, if a portion of the surface tends to wear over time, bringing the surfaces 32, 34 together for purposes of calibration and backing off a predetermined number of rotations at the worm gear 64 will still produce the desired gap 74. The gap 74 is consistent regardless of the dimensional wear on the surfaces 32, 34 as a result of being able to repeatedly recalibrate the relationship of the burrs.

It should be noted that there can be a variety of configurations of the burr adjuster 54 and that only one embodiment of the burr adjuster 54 is disclosed. Further, while the worm gear 64 is shown as being generally tangential to the corresponding teeth 56, it is envisioned that the adjuster 54 could be rotated 90 degrees to mesh with an appropriately configured gear such as a pinion gear, being attached to the drive 68. Such a rotated configuration may provide a longer range of axial movement of the non-rotatable burr 38. It is within the scope of the present disclosure that other forms of adjuster 54 could be included such as by way of hydraulics, pneumatics, spring biasing or any other form of adjuster which are currently available or may be provided in the future.

With the foregoing in mind, it should also be noted that the input device 84 is intended to be broadly interpreted. In this regard the input device 84 could be embodied in a keyboard, electrical information, inductive or conductive communication as well as, perhaps manual adjustment of rotary dials or other devices provided in the grinder 20. The input device 84 could also be a programmable chip or other device which is inserted into or otherwise coupled to the controller 82 to provide relevant information to the controller 82 for use in adjusting the burrs 38, 40.

In one use of the present disclosure, only one type of bean 27 is placed in the hopper 26 and only one type or grind of bean is desired. However, the present grinder 20 still provides for calibration of the burrs 38, 40 upon each grinding event, periodic programmed periods of a predetermined number of grinding events or other such occurrence as well as calibration upon selection by the user such as by requesting a calibration cycle using the input device 84. Regardless of the motivation for the calibration, the grinder assembly 24 as described can be calibrated to maintain a desired dimension 74 between the burrs 38, 40.

Before initiation of a grinding cycle, the controller 82 can operate the adjuster 54 to bring the surfaces 32, 34 of the burrs 38, 40 together. The load sensor 102 will sense a resistance which occurs when the two surfaces 32, 34 contact each other. Upon sensing this condition, the controller 82 stops advancement of the burr 38 towards the burr 40 by deactivating the motor or actuator 68. The controller 82 then controls the adjuster 54 in the opposite direction to back off the burr 38 from the burr 40 a desired dimension 74 to provide a desired gap between the surfaces 32, 34. Once the controller 82 deactivates the adjuster 54 the engagement of the gear 64 with the teeth 56 and the threads 62 with the chamber 42 wall helps to maintain, retain or otherwise hold or lock the desired adjustment between the burrs 38, 40. With this in mind, while a threaded barrel 64 has been shown and described, it is possible that the barrel 64 may not include the threads 62. This may result if the configuration of the adjuster 54 with the burr 38 is sufficient so as to not require the additional benefit of the precision adjustment of the thread 62.

Once the desired calibration is achieved, the grinder drive or motor 44 is operated thereby rotating the shaft 48 and driving the generally rotatable burr 40. A controllable slide gate mechanism of known construction may be provided between the hopper 26 and the grinding chamber 42 thereby facilitating controller introduction of beans into the gap 74 between the burrs 38, 40.

In another embodiment of the grinder 20, the input device 84 may allow for selection of a variety of grinds or even custom selection of a desired grind. In this regard, the input device would be controllable by the user or passive such that the information is pre-programmed into a memory device such as a card, inductive or conductive device, a bar code presented to a bar code reader type of input device 84 or other devices or systems for inputting the information. The selection of a desired grind at the input device 84 is provided to the controller 82. Before grinding beans, the controller 82 can operate the adjuster 54 to controllably adjust the gap 74 between the burrs 38, 40. The adjustment is carried out in much the same manner as described above. However, the adjuster 54 backs off the burr 38 from the burr 40 dimension which corresponds to the selected grind. Such information may be stored in the memory 98 such that a desired grind corresponds to, a gap dimension 74. Once again, the present disclosure provides a desirably consistent adjustment such that the gap dimension 74 is generally a fixed amount and does not depend upon the degree of wear on the burr surfaces 32, 34.

With the foregoing in mind, however, it is envisioned that the present disclosure can also compensate for wear on the burrs 38, 40. In this regard, the burrs generally are expected to have a predetermined life of some number of grinding operations. Information could be provided to the controller 82 or otherwise programmed into the system 80 to make minor adjustments to account for regular and ordinary wear on the surfaces 32, 34. For example, if the burrs 38, 40 are expected to maintain a sufficiently honed surface after ordinary grinding of coffee bean of, perhaps, 5000 cycles, the information can be provided to the controller 82. Knowing that there will be some wear of the honed surfaces 32, 34, minor incremental adjustments can be made to gap 74 to slightly decrease the gap 74, for example, at a point half-way through the life of the burrs and three-quarters of the way through the life of the burrs.

In yet another embodiment, the system 80 may include the sensors 90, 92. It should be noted that the above descriptions may or may not include the sensors 90, 92. In the presently discussed additional embodiment, the sensors 90, 92 monitor the gap 74. When the controller 82 detects that the sensors 90, 92 indicate that the gap has fallen outside of a desired range, either too large or too small, the controller 82 can operate the adjuster 54. In this regard, it may not be necessary to bring the surfaces 32, 34 into engagement and then back off the burr 38. In other words, the sensors 90, 92 can provide feedback to the controller and provide information to operate the burr adjuster 54. Continued feedback from the sensors 90, 92 through the controller in relation to the operation of the burr adjuster 54 results in obtaining and maintaining a desired gap 74 between the surfaces 32, 34. Such monitoring can be used to monitor and adjust the gap 74 to be smaller or larger to obtain a desired gap spacing. While it may be preferable to make such adjustments when the rotating burr 40 is not in operation, it is within the scope of the present disclosure to allow the adjustment by way of the adjuster 54 to occur during a grinding cycle.

Figure 5:
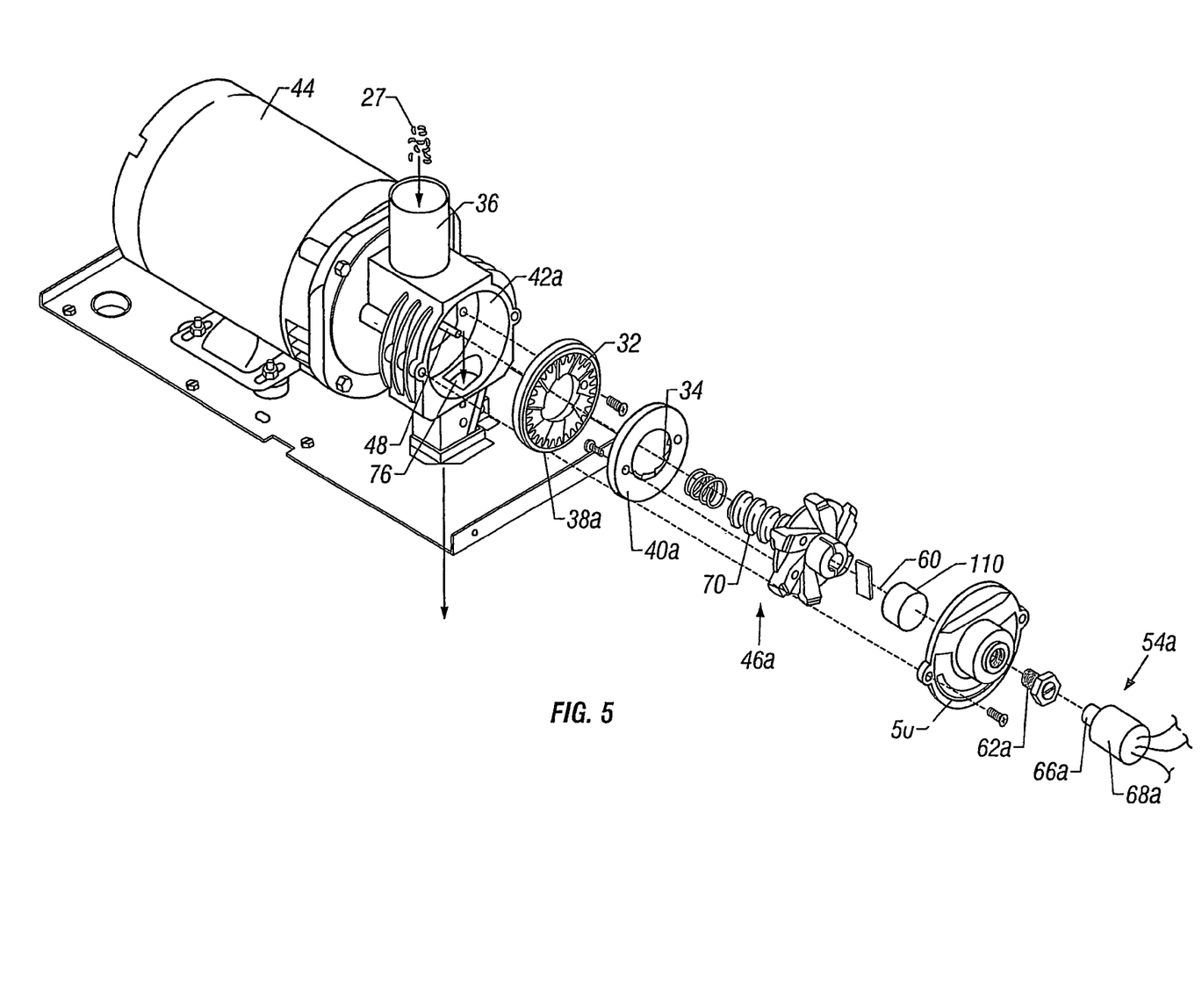
FIGS. 5 and 6 show diagrammatic illustrations of another embodiment of the grinder assembly.
Figure 6:
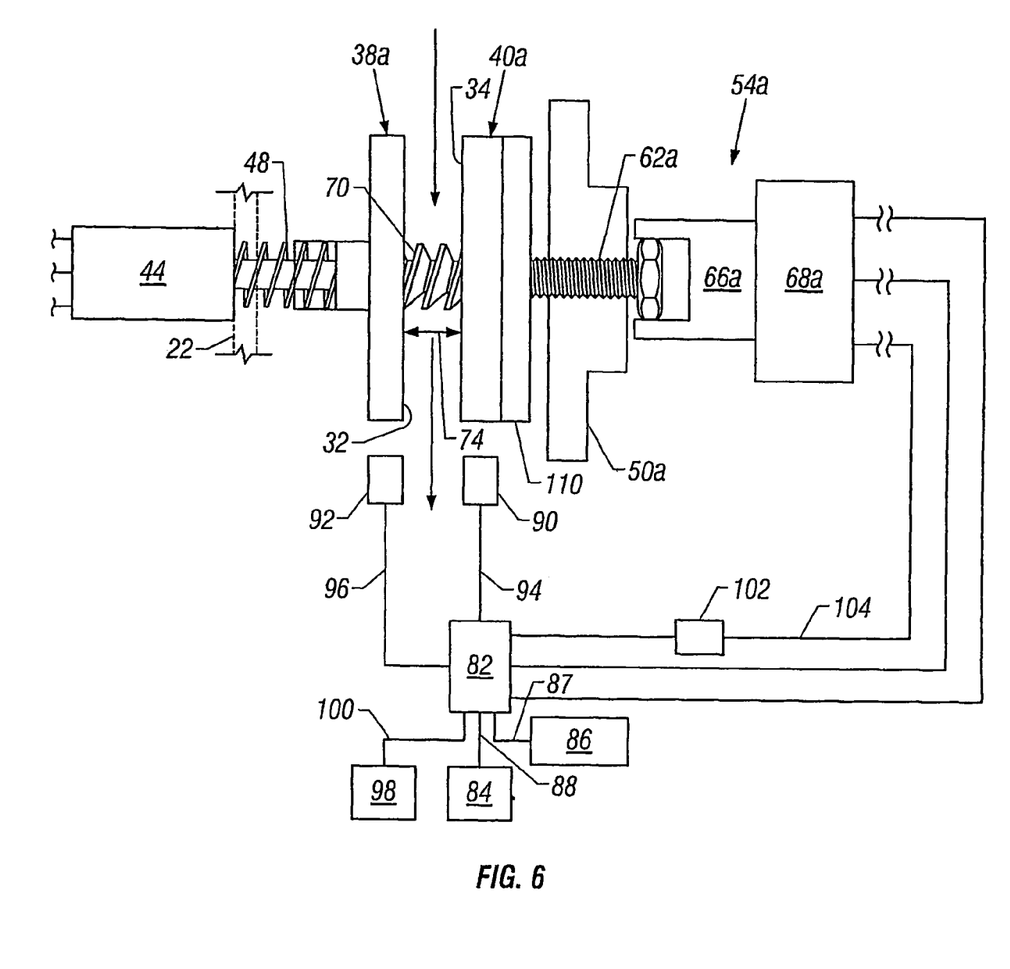

An additional embodiment of a grinder assembly 24a is shown in FIGS. 5 and 6. Consistent with the description provided above, the grinder assembly 24a and the system 80a are shown generally diagrammatically. It is envisioned that one of skill in the art will understand the structure and function of this embodiment based on the information provided in FIGS. 5 and 6 in combination with the foregoing disclosure.

As shown in FIGS. 5 and 6, the adjuster 54a adjusts the burrs 38a, 40a from the end associated with the rotating burr 40a. This is in contrast to adjustment of the generally non-rotating burr 38 as described above with regard to FIGS. 2-4. Moreover, this embodiment also includes a controllable motor 68a in combination with an adjuster body 64a to controllably adjust a threaded portion 62a. The threaded portion 62a is provided by way of a threaded shaft which extends through the cover 50a. The adjustment of the threaded shaft 62a imposes axial adjustment on a plate 110. The controller 82, display 86, input 84, memory 98 and sensors 90, 92 operate in the manner as described above with regard to FIGS. 1-4. The embodiment shown in FIGS. 5 and 6 provides a way of adjusting the grinder assembly 24 by means of adjusting the rotating burr 40a.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A grinder for grinding materials, the grinder comprising:
a grinder housing;
a grinding burr assembly retained in the housing;
the grinding burr assembly having a pair of grinding burrs for grinding material therebetween;
a first burr having a first grinding surface;
a second burr having a second grinding surface retained generally in opposition to first grinding surface of the first burr;
a grinder drive;
the second burr is a rotatable burr coupled to the grinder drive;
the first burr is a generally non-rotatable burr adjustably retained in the grinder housing;
a shaft of the grinder drive extending through the first burr and connected to the second burr with an auger positioned at least in the area between the burrs;
a controllable burr adjuster operatively coupled to the grinding burr assembly for controllably adjusting a space between the first and second grinding surfaces of the burrs;
the controllable burr adjuster coupled to and moving with the burr adjusted by the adjuster;
an adjuster body threadedly engaged with the housing;
a controllable burr adjustment drive is engaged with the adjuster body; and
the burr adjuster drive is a rotating drive for controllably rotating the adjuster body to controllably adjust a space between the rotatable burr and non-rotatable burr.

2. The grinder for grinding material as in claim 1, further comprising a biasing device retained in the grinder housing abutting one of the rotatable burr and non-rotatable burr in opposition to the adjuster to provide a biasing force on the grinding burrs.

3. A coffee grinder for grinding coffee beans, the coffee grinder comprising:
a grinder housing;
a controllable grinding assembly retained in the housing;
the grinding assembly having a bean grinding assembly for grinding coffee beans into particles of a generally predetermined size range;
the bean grinding assembly having a first grinding burr and a second grinding burr for grinding coffee beans;
the first grinding burr having a first grinding surface;
the second burr having a second grinding surface retained generally in opposition to first grinding surface of the first burr;
the second grinding burr is a generally non-rotatable burr adjustably retained in the grinder housing;
a gap being defined between the first grinding surface of the first grinding burr and the second grinding surface of the second grinding burr between which coffee beans are ground;
a grinder drive;
the first grinding burr is a rotatable burr coupled to the grinder drive;
a shaft of the grinder drive extending through the second grinding burr and connected to the first grinding burr with an auger positioned at least in the area between the burrs;
a controllable burr adjuster including a controllable adjustment drive, and an adjuster body coupled to and moving with the second grinding burr for controllably moving the second grinding burr relative to the first grinding burr and to adjust the gap between the first grinding surface and the second grinding surface;
the adjuster body being threadedly engaged with a portion of the housing, a controllable burr adjustment drive engaged with the adjuster body, the burr adjuster drive is a rotating drive for controllably rotating the adjuster body to controllably adjust a space between the first grinding burr and second grinding burr.

4. The coffee grinder as in claim 3, further comprising a biasing device retained proximate to the bean grinding assembly abutting one of the first burr and second burr in opposition to the adjuster to provide a biasing force on the grinding burrs.

5. A grinder for grinding materials, the grinder comprising:
a grinder housing;
a grinding burr assembly retained in the housing;
the grinding burr assembly having a pair of grinding burrs for grinding material therebetween;
a first burr having a first grinding surface;
a second burr having a second grinding surface retained generally in opposition to first grinding surface of the first burr;
a grinder drive;
the second burr is a rotatable burr coupled to the grinder drive;
the first burr is a generally non-rotatable burr adjustably retained in the grinder housing including gear teeth on an exterior surface;
a shaft of the grinder drive extending through the first burr and connected to the second burr with an auger positioned at least in the area between the burrs;
a controllable burr adjuster operatively coupled to the grinding burr assembly for controllably adjusting a space between the first and second grinding surfaces of the burrs;
the controllable burr adjuster includes a controllable gear drive engaged with gear teeth on the non-rotatable burr with the controllable gear driving and controllably moving the non-rotatable burr; and
the controllable burr adjuster coupled to and moving with the burr adjusted by the adjuster.

6. A coffee grinder for grinding coffee beans, the coffee grinder comprising:
a grinder housing;
a controllable grinding assembly retained in the housing;
the grinding assembly having a bean grinding assembly for grinding coffee beans into particles of a generally predetermined size range;
the bean grinding assembly having a first grinding burr and a second grinding burr for grinding coffee beans;
the first grinding burr having a first grinding surface;
the second burr having a second grinding surface retained generally in opposition to first grinding surface of the first burr;
the second grinding burr is a generally non-rotatable burr adjustably retained in the grinder housing;
a gap being defined between the first grinding surface of the first grinding burr and the second grinding surface of the second grinding burr between which coffee beans are ground;
a grinder drive;
the first grinding burr is a rotatable burr coupled to the grinder drive;
a shaft of the grinder drive extending through the second grinding burr and connected to the first grinding burr with an auger positioned at least in the area between the burrs;
a controllable burr adjuster operatively coupled to the second grinding burr for controllably moving the second grinding burr relative to the first grinding burr and to adjust the gap between the first grinding surface and the second grinding surface;
the controllable burr adjuster coupled to and moving with the second grinding burr;
gear teeth on an exterior surface of the second grinding burr;

a controllable gear drive of the controllable burr adjuster engaged with gear teeth on the second grinding burr; and
the controllable gear drive controllably moving the second grinding burr.

* * * * *